(12) United States Patent
Freystedt (10) Patent No.: US 7,055,850 B2
(45) Date of Patent: Jun. 6, 2006

(54) COMPONENT FOR MOTOR VEHICLES WITH AIRBAG COVER

(75) Inventor: Bernd Freystedt, Freiburg (DE)

(73) Assignee: Peguform GmbH & CO KG, Bötzinger (DE)

(*) Notice: Subject to any disclaimer, the term of this patent is extended or adjusted under 35 U.S.C. 154(b) by 0 days.

(21) Appl. No.: 10/490,121

(22) PCT Filed: Sep. 9, 2002

(86) PCT No.: PCT/EP02/10069

§ 371 (c)(1),
(2), (4) Date: Mar. 19, 2004

(87) PCT Pub. No.: WO03/029055

PCT Pub. Date: Apr. 10, 2003

(65) Prior Publication Data

US 2004/0232661 A1    Nov. 25, 2004

(30) Foreign Application Priority Data

Sep. 26, 2001 (DE) ................................ 101 47 547

(51) Int. Cl.
*B60R 21/20* (2006.01)
(52) U.S. Cl. .................................. 280/728.3
(58) Field of Classification Search ............. 280/728.3, 280/728.1, 732
See application file for complete search history.

(56) References Cited

U.S. PATENT DOCUMENTS

| | | | |
|---|---|---|---|
| 5,342,088 A | 8/1994 | Bauer | |
| 5,431,435 A | 7/1995 | Wilson | |
| 6,357,788 B1* | 3/2002 | Kreile | 280/728.3 |
| 6,440,514 B1* | 8/2002 | Ueno et al. | 428/43 |

FOREIGN PATENT DOCUMENTS

| | | |
|---|---|---|
| DE | 298 11 739 | 9/1998 |
| DE | 199 30 754 A | 1/2000 |
| DE | 198 37 421 A1 | 2/2000 |
| DE | 199 58 865 A1 | 6/2001 |
| DE | 100 57 003 A | 9/2001 |
| EP | 0 583 079 A1 | 2/1994 |
| FR | 2 784 627 A | 4/2000 |

\* cited by examiner

*Primary Examiner*—Faye M. Fleming
(74) *Attorney, Agent, or Firm*—Henry M. Feiereisen; Ursula B. Day (57) ABSTRACT

The invention concerns a component (1) for motor vehicles, in particular, instrument panel, lateral covering or side member covering, comprising an airbag cover (2) arranged in the region of the filler channel (3) and having a weaker resistance zone opening when the airbag is inflated. The covering zone located on either side of the weaker resistance zone can move freely, from an extracted airbag, along a clearance path while remaining linked to the component 91), after the airbag has been inflated, in specific manner. The airbag cover (20) is an elastic material. The weakened resistance zone extends over the opposite delimitations (4, 5) of the filler channel 93), so as to ensure the extension and inflation of the airbag. Said device eliminates possible damage to the inflated airbag and injury risks incurred by passengers as result the burst parts projected coming from said cover.

14 Claims, 10 Drawing Sheets

COMPONENT FOR MOTOR VEHICLES WITH AIRBAG COVER

BACKGROUND OF THE INVENTION

The invention relates to a component for a motor vehicle, in particular an instrument panel, side panel or support panel with an airbag cover, which is arranged in an deployment area associated with a deployment channel and which is provided with a weakened zone that will open upon release of an airbag, wherein areas of the airbag cover located on either side of the weakened zone are movable for clearing the deployment path of the releasing airbag and remain attached to the component after the airbag has inflated.

A component of this type is known from EP 0583 079 A1. The afore-described component configured as an instrument panel shows an airbag cover which is arranged in the deployment channel and which is configured as a unitary piece with the instrument panel, which is of a rigid foam material. A weakened zone in the airbag cover is formed through a material reduction which, upon deployment of the airbag, breaks open under formation of two wing portions that are located laterally on each side of the weakened zone. On either side of the weakened zone, the airbag cover is provided with hinge areas that are likewise formed by means of material reduction and after breaking open the weakened zone, an unfolding and turning around of the wings is realized. Further examples for similar solutions are found in publications DE 199 30 754 A1 or DE 100 57 003 A1.

Regarding the least possible endangerment of passengers, with that type of airbag cover, pieces bursting off the airbag cover, upon deployment of the airbag, is prevented. There is however the drawback that under certain circumstances the deploying airbag can be damaged in the area of the wing edges. Furthermore, damage to the passengers cannot be completely precluded in case the wings completely separate upon deployment of the airbag. Such a solution is shown in U.S. Pat. No. 5,342,088A. Another solution is disclosed in U.S. Pat. No. 5,431,435. Instead of two wings, only one opening is provided, whereby the airbag cover, in case release of airbag is triggered, projects into the interior vehicle space to only a small degree. The opening is formed as a linear weakening zone, which opens in the shape of an ellipse upon inflation of the airbag, whereby the airbag cover protrudes outwardly towards the interior of the vehicle.

None of the latter two documents suggest a steady opening of an airbag cover of elastic material in combination with a weakened zone that extends beyond the borders of a deployment channel into the instrument panel.

SUMMARY OF THE INVENTION

Object of the invention is to provide a component of the afore-described type, which is characterized by a relatively simple and cost-efficient production method and which prevents injury of passengers and the risk of damage to the unfolding airbag in a vehicle which has been outfitted with the component.

A solution to this object is provided with the component according to the present invention of the type as set forth in the introduction in that the airbag cover manufactured of an elastic material, and that the airbag cover and the weakened zone extend so far over the opposite borders of the deployment channel that proper deployment and inflation of the airbag is ensured.

Since the airbag cover is made from elastic material, a certain flexibility is realized which, after opening of the weakened zones, allows a flexible yielding of the airbag cover upon emergence of the airbag from the deployment channel, without the risk of damage to the airbag. The normally considerable extension of the airbag cover beyond the opposite delimitations of the deployment channel and the weakened zones, in combination with the relatively high flexibility of the airbag cover, results in a type of expansion opening which can be likened to a fish mouth. The flexible areas on each side of the weakened zones yield under a certain widening due to the forces applied through the inflating airbag and due to this widening in the area of the weakened zones, clearance for the inflating airbag is realized.

In a practical development of the embodiment, the airbag cover is back-injected in the area of deployment of the component. As a result, an especially secure connection between the component and the airbag cover is realized with a relatively simple production.

In a further advantageous embodiment, in order to realize a steady opening performance, the longitudinal extension of the weakened zone extends on either side beyond the dimension of the deployment channel, which corresponds to at least half of the distance between the opposing delimitations of the deployment channel.

Based on technical considerations, it would be practical to configure the delimitations of the deployment channel as unitary with the walls forming the airbag cover.

In the latter embodiment, it is advantageous for a force decoupling around the areas of the weakened zones, to provide a decoupling recess between the side of the air bag cover facing the interior of the vehicle and the walls.

Where the deployment channel has a longitudinal dimension and a longitudinal distance and a transverse direction with a transverse distance smaller as compared to the longitudinal dimension, it is practical that the weakened zone extends also in longitudinal direction.

According to a variation of an embodiment, the weakened zone is slot shaped with adjoining marginal surfaces of material surrounding the weakened zone.

According to another embodiment, the weakened zone is formed by a material recess.

In a practical manner, the airbag cover is produced from polypropylene-ethylene-propylene-dein-rubber (PPEPDM), an elastic material.

With regard to realizing highest possible form stability in the component, as a practical matter, a support of the component is formed with a relatively thin form stabilization layer in the area of deployment. The form stabilizing layer, for example, prevents caving-in of the deployment area, so that an airbag can be released essentially unimpaired under widening of the airbag cover along the weakened zones due to the form stabilizing layer being relatively thin.

BRIEF DESCRIPTION OF THE DRAWING

Other features and advantages of the present invention will now be set forth in the following description of currently preferred exemplified embodiments of the invention with reference to the accompanying drawing, in which.

DETAILED DESCRIPTION OF PREFERRED EMBODIMENTS

Figure 1:
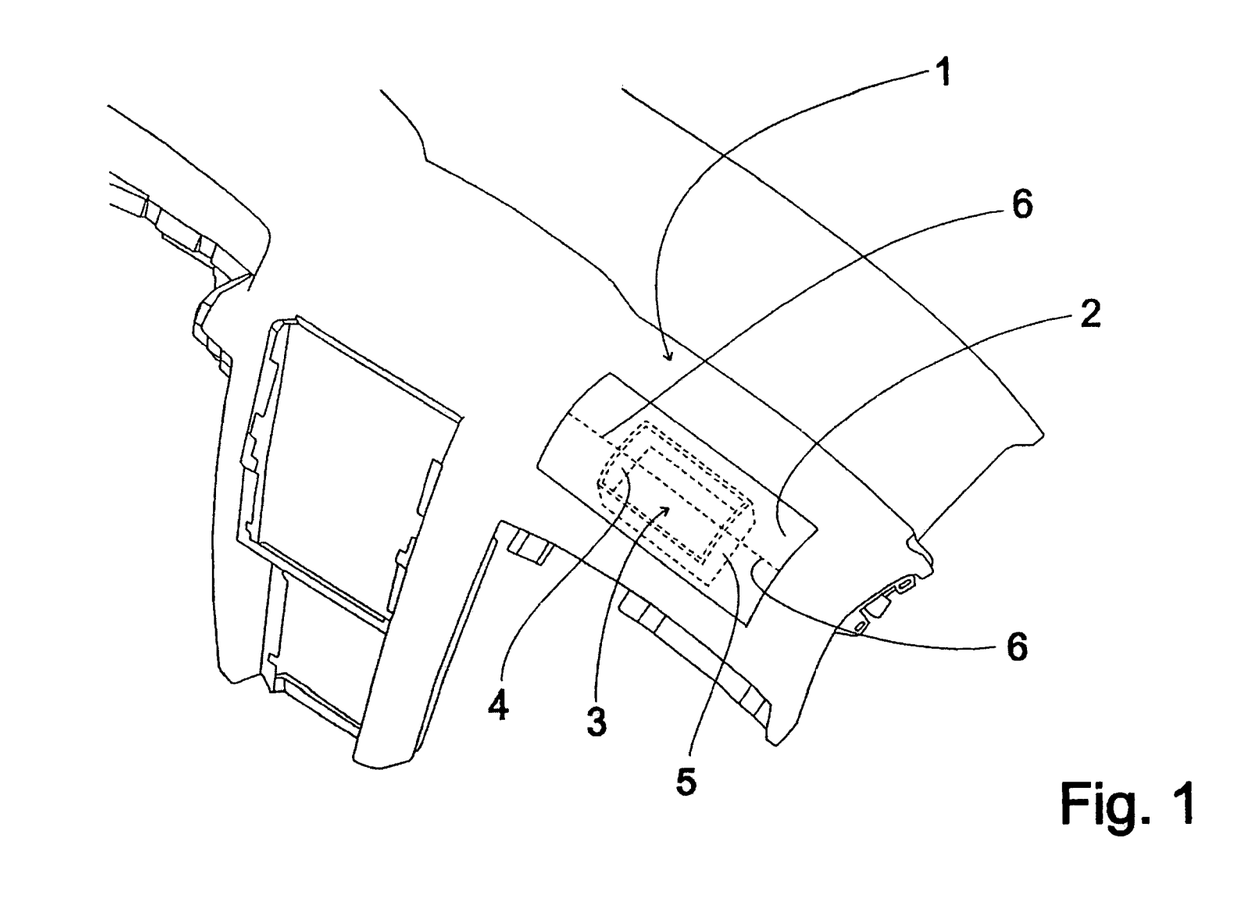
FIG. 1 is a perspective view showing a detail of a component configured as an instrument panel for motor vehicles with a closed airbag cover.

FIG. 1 shows a perspective view of an instrument panel 1 as an embodiment of the component for motor vehicles according to the present invention. The instrument panel 1, which can also be produced from a hard plastic material, shows an airbag cover 2 of elastic plastic material. The airbag cover 2 is disposed in the area of the deployment channel 3, which serves as a receptacle of an airbag not shown in FIG. 1. The airbag cover 2 covers the deployment channel 3 and exhibits a single weakened zone 6 extending preferably centrically between opposite walls 4, 5, which delimit the deployment channel 3, and extending relatively far, for example about one half of each the distance of the walls 4, 5, beyond each of the walls 4, 5 that serve as a delimitation of the deployment channel. The weakened zone 6 is formed, for example, by providing a slot or a recess in the surface of the instrument panel 1 facing away from the interior of the vehicle.

Figure 2:
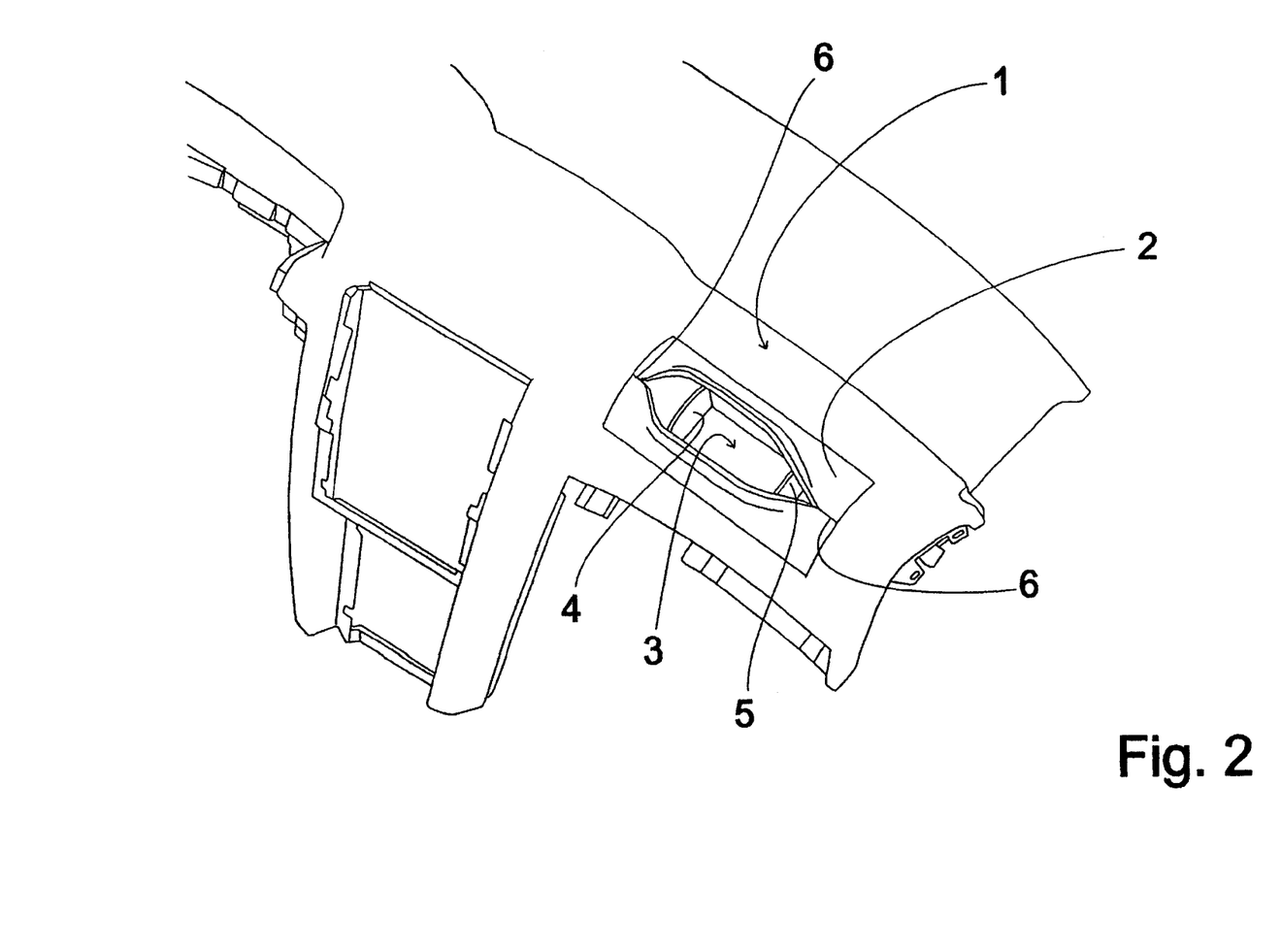
FIG. 2 is a perspective view of the detail of the instrument panel of FIG. 1 with an open airbag cover.

FIG. 2 shows a perspective view of the detail of the instrument panel 1 according to FIG. 1 with an open airbag cover 2. The opening of the airbag cover 2 is caused by the release of an inflating airbag not shown in FIG. 2. The so inflating airbag thus exerts forces which lead to an opening of the weakened zone 6 and a flexible widening of the airbag cover 2 at either side of the weakened zone 6.

By means of forming the weakened zone 6 so it extends from the deployment channel 3 relatively far beyond the walls 4, 5, the path is cleared for the unfolding airbag. The areas at either side of the weakened zone 6 of the airbag cover 2 are pitching up thereby causing a continuous deformation of the airbag cover 2 due to the material elasticity of the airbag cover and the lack of further weakened zones in the marginal area of the airbag cover. Peak stresses in the airbag cover 2 are thus prevented and the risk of any injury to passengers in the vehicle of being hit by parts bursting off the airbag cover 2 is almost entirely precluded.

Figure 3:
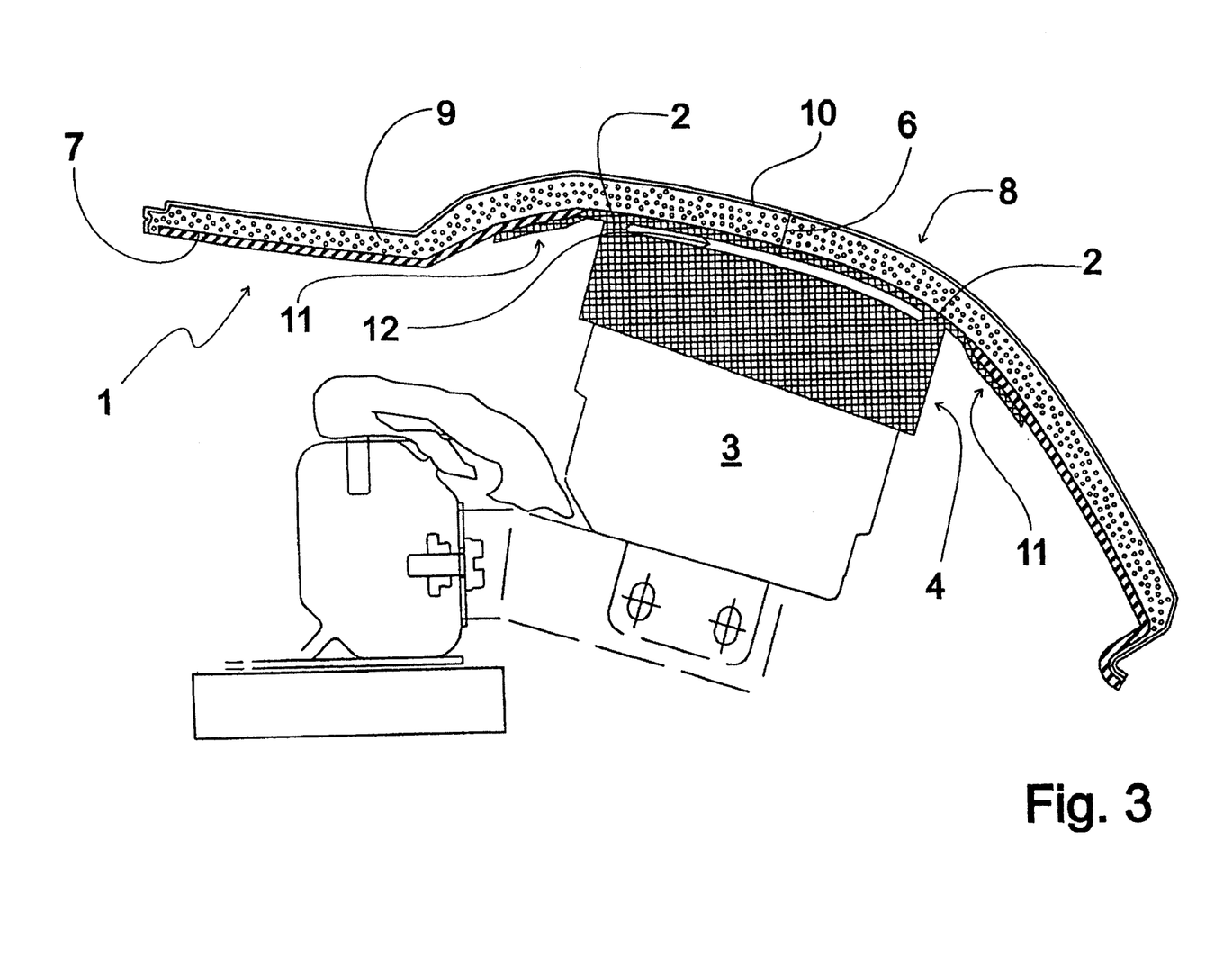
FIG. 3 and FIG. 4 are sections of a first example of an embodiment of an instrument panel, which is a component for motor vehicles in the area of the airbag cover where in a deployment area a support is formed with a recess.

FIG. 3 shows a transverse section of the weakened zone 6 and through a transverse side of the wall 4 through the instrument panel 1 in the area of the airbag cover 2. From FIG. 3, it can be seen that the instrument panel 1 includes a support 7 of hard plastic material. The instrument panel 1 has a deployment area 8, with a recess formed in the support 7 in the area of the deployment channel 3. When used according to regulation, the support 7 is covered with a foam layer 9 at the surface facing the vehicle interior. The foam layer 9 in turn is covered with a thin film 10 at its surface facing away from the support 7.

As seen in FIG. 3, the elastic airbag cover 2, in the area of deployment 8 and at the edge of the recess in support 7, is connected to support 7 in a circumferential area of overlap 11 and ends flush with the side of the support 7, which borders the foam layer 9. In the example of the embodiment as shown, the walls 4, 5 of the deployment channel 3 are formed in a single piece with the airbag cover 2. For a force-related decoupling of the part of the airbag cover 2 and the walls 4, 5 which directly borders the foam layer 9, a decoupling recess 12 is provided so that upon unfolding the air bag, the part of the airbag covers 2 bordering the foam layer 9 and the walls 4, 5, remains edgewise connected.

The weakened zone 6 in the embodiment as illustrated extends through the component directly bordering the foam layer 9 of the airbag cover 2, through the foam layer 9 and the film 10. As a result, only a small force is necessary for opening the air bag cover 2.

Figure 4:
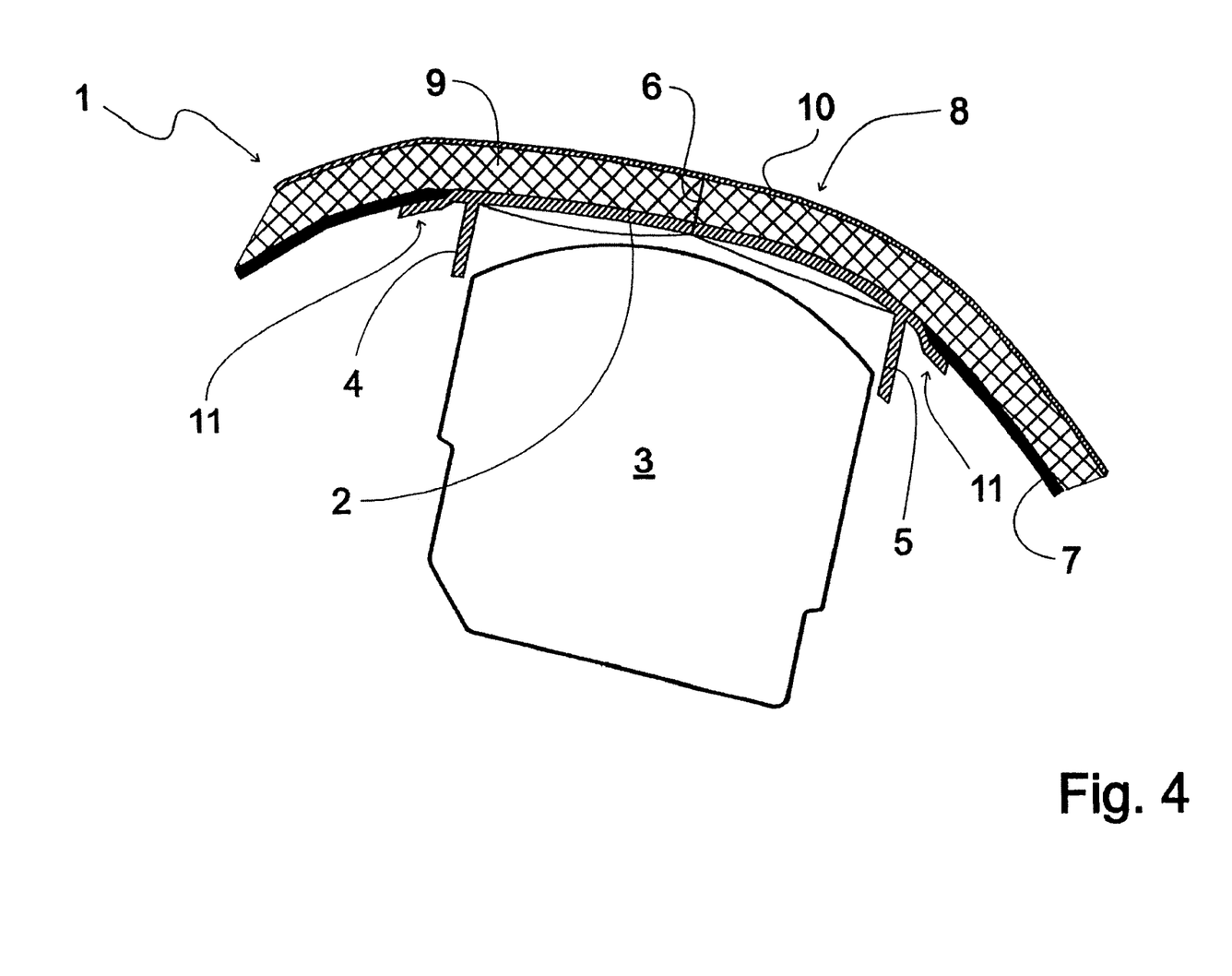

FIG. 4 shows a transverse section through the weakened zone 6 and through a transverse side of the walls 4, 5 through the instrument panel 1 in the area of the airbag cover 2.

From FIG. 4 it can be seen, that walls 4, 5 in longitudinal direction of the instrument panel 1 are configured in a continuous manner, not as in transverse direction, with decoupling recesses.

Figure 5:
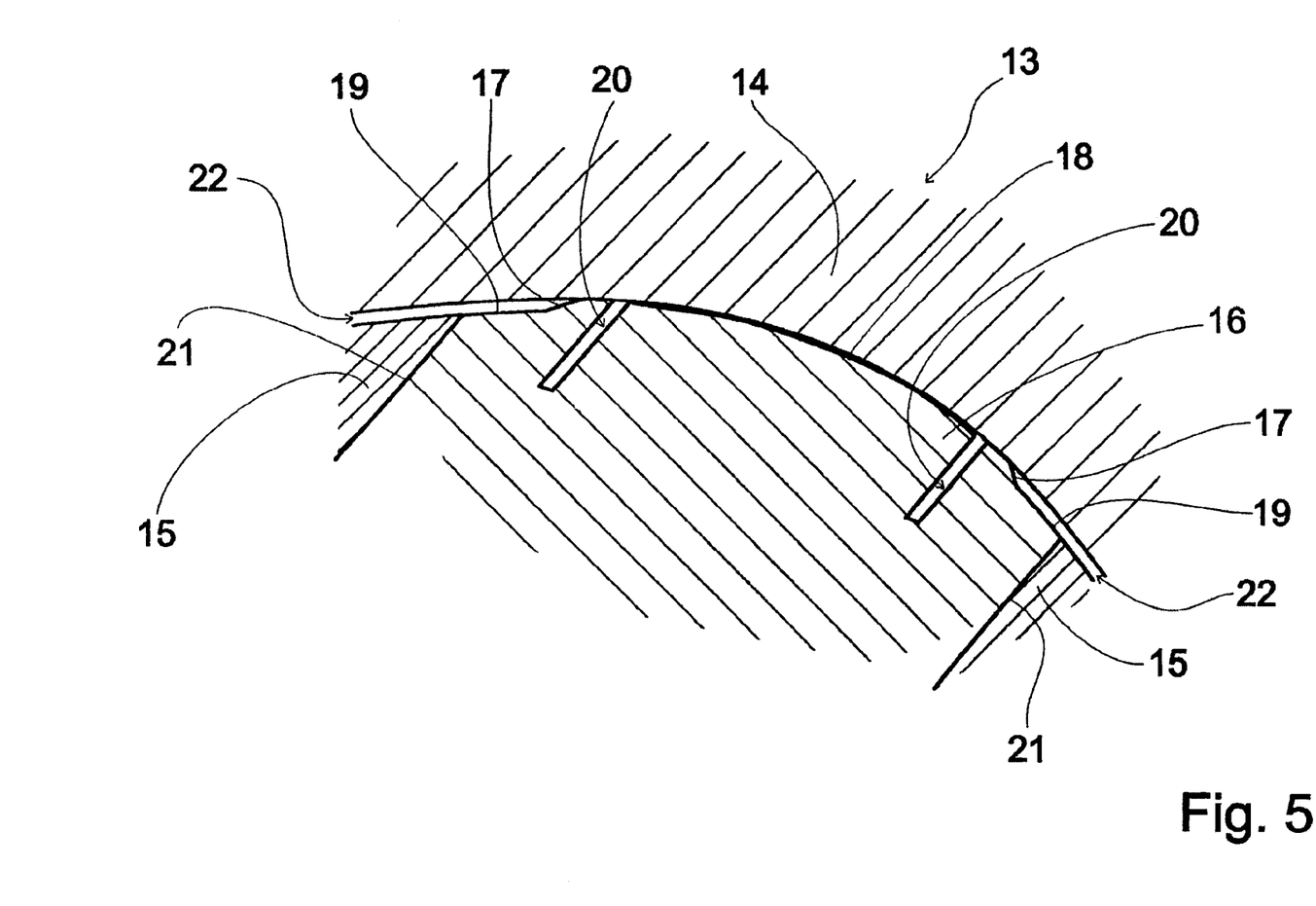
FIG. 5 to FIG. 7 show sections of a mold for the production of a component according to the invention in various stages of production.
Figure 6:
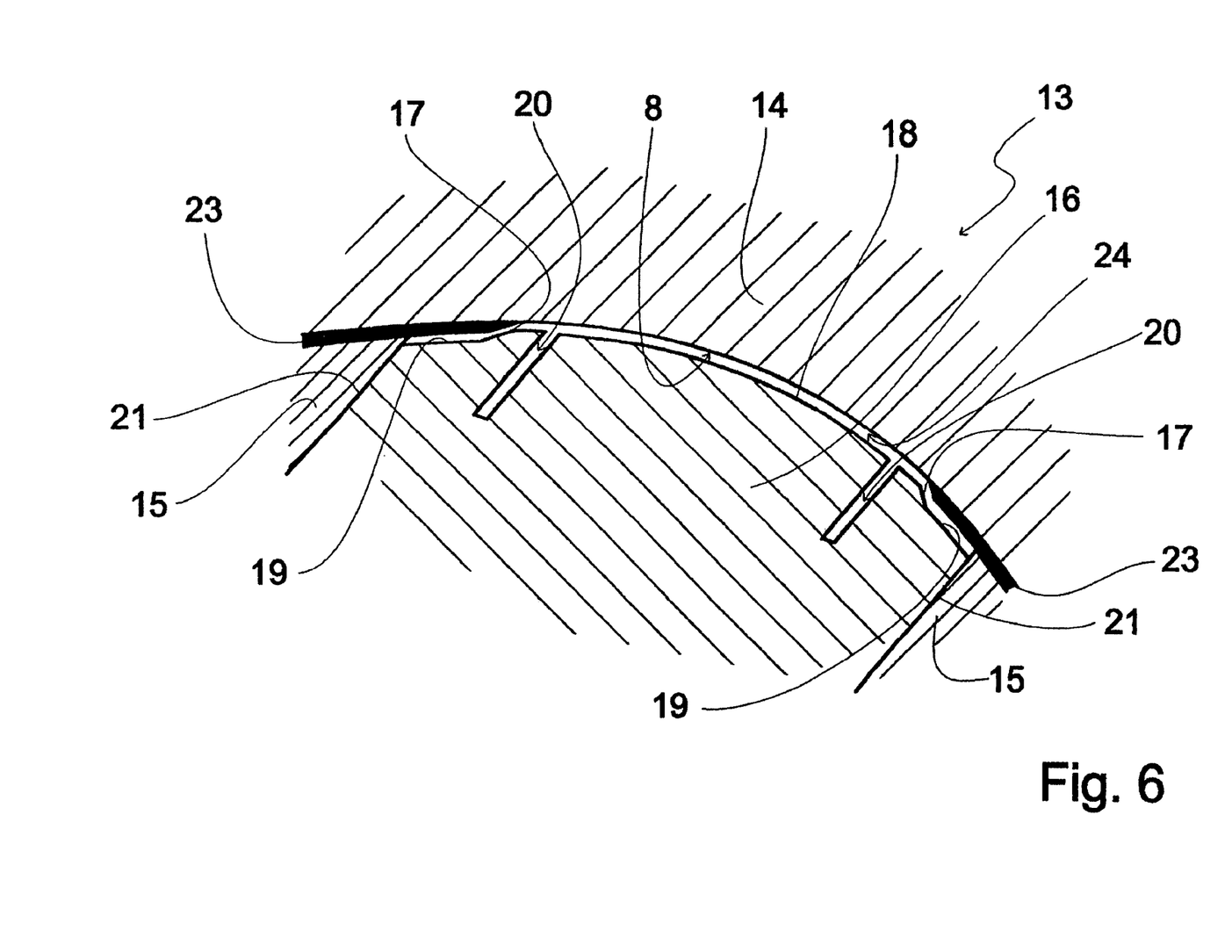
Figure 7:
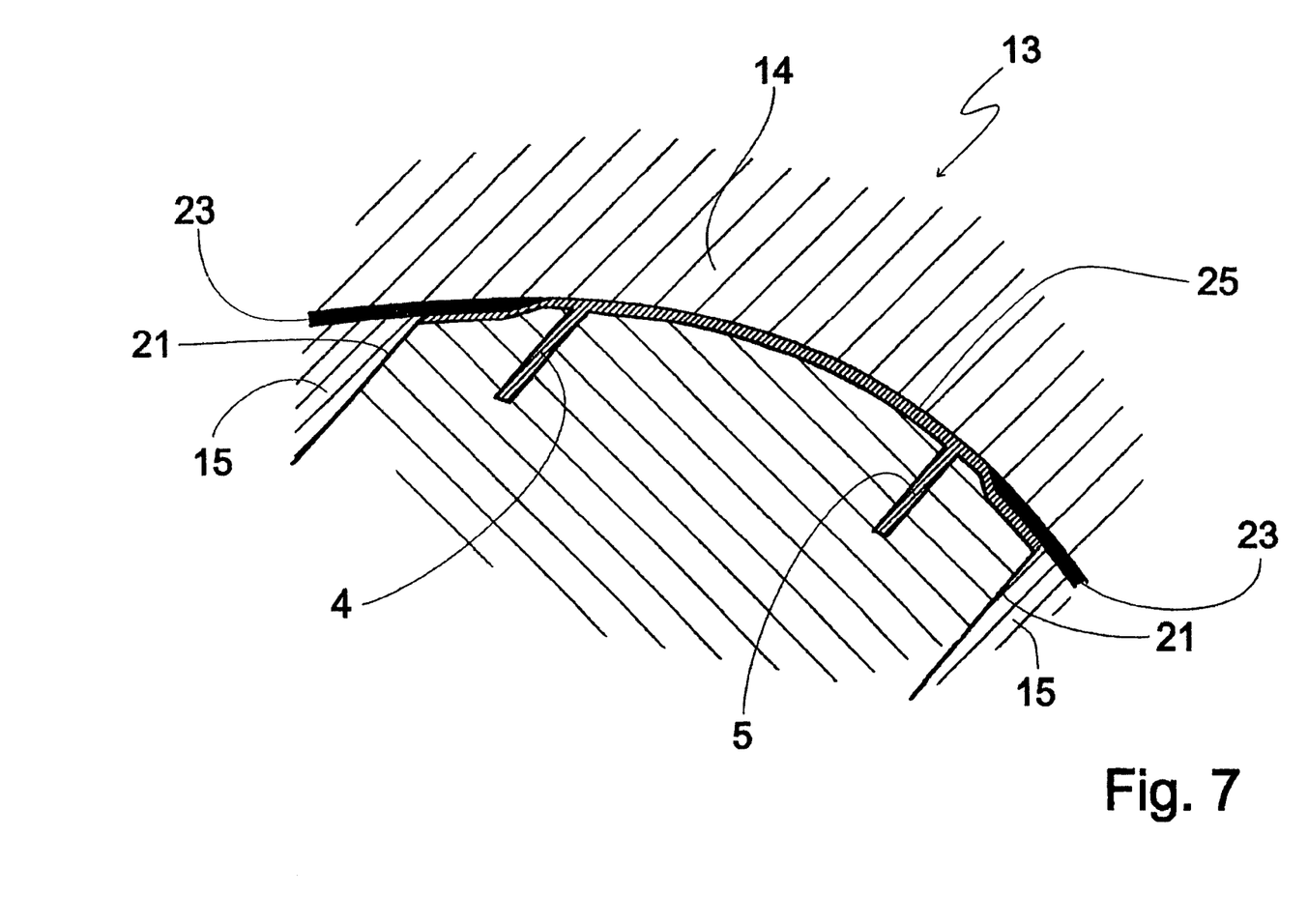

FIG. 5 to FIG. 7 show a section view of a form part 13 of a component according to the present invention, for example an instrument panel 1 according to FIG. 1 to 4 in various stages of production.

The mold 13 comprises a basic mold part 14, a first mold complementary part 15 which is stationary during production and also a movable second complementary mold part 16. The stationary first complementary mold part 15 is arranged in a fixed distance from the basic mold part 14 until the opening the mold part 13 for demolding. The movable second complementary mold part 16 is provided with a shoulder 17, which creates a transition between the frontal mold surface 19 and a recessed mold surface opposite the frontal mold surface 19. In the area of the frontal mold surface 18, hollow wall spaces 20 are arranged in the movable second complementary mold part 16 that extend from the frontal complementary mold part 18 in direction away from the frontal complementary mold part 18 and parallel to the formed gliding surfaces 21 between the stationary first complementary mold part 15 and the movable second complementary mold part 16.

FIG. 5 shows the production stage before filling the material into mold 13. During this stage, the frontal mold surface 18 of the movable complementary mold part 16 bears against the basic mold part 14, so that between the basic mold part 14, the stationary first complementary mold part 16, and the movable second complementary mold part 16, an instrument panel hollow space 22 is formed which terminates in the area of the shoulder 17 adjoining the basic form part 14.

FIG. 6 shows the stage after placing the hard plastic-material 23, such as glass fiber reinforced polypropylene (PP-GF), into the mold 13 according to the arrangement as shown in FIG. 4 and after moving the movable second complementary mold part 16 away from the basic mold part 14 for formation of a cover hollow space 24 between the basic mold part 14 and the movable second complementary mold part 16. On the one hand, the hollow space of cover 24 is bordered at the margin by the recessed mold surface 19 and shoulder 17 and the frontal from surface 18; and on the other hand, by the marginal area of the hard plastic material 23 and the respective area of the basic mold part 14 of deployment area 8, which was formerly covered by the frontal mold surface 18. The hollow wall spaces 20 are now also exposed.

FIG. 7 shows that stage after filling the elastic material 25 such as a polypropylene-ethylene-propylene-dein rubber (PP-EPDM) for the formation of the airbag cover 2 in the arrangement according to mold 13 in FIG. 5. The hollow space cover 24 and the hollow wall spaces 20 are now completely filled with back-injected elastic material. At the margin, the airbag cover 2 adjoins the surface of the instrument panel 1 facing away from the interior of the vehicle, while the surface of the instrument panel 1 facing the interior of the vehicle and the airbag cover 2 essentially form a flush transition. For demolding the instrument panel 1 with the back-injected airbag cover 2, the movable second complementary mold part 16 is withdrawn and subsequently the mold 13 opened and the instrument panel taken out.

In a variation of the embodiment not shown here, the weakened zone 6 is for example configured in the form of a slot that extends through that part of the airbag cover 2 which borders the foam layer and through the foam layer 9 up to the remaining thickness of the film 10.

In a further variation not shown here, preferably with films 10 that break open easily, the slot or the material recess extends only to the remaining thickness of the foam layer 9.

Figure 8:
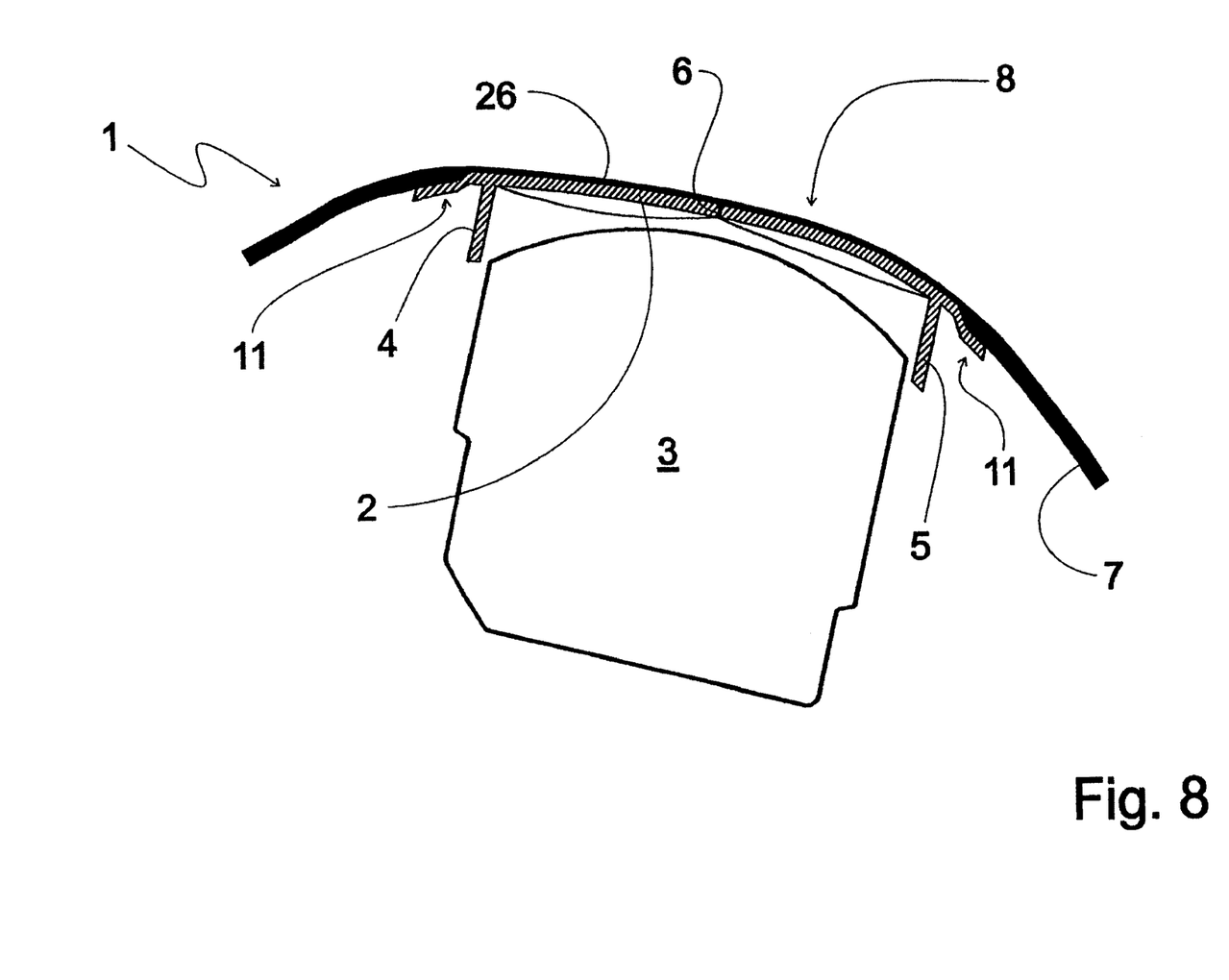
FIG. 8 to FIG. 10 show sections of further embodiments of an instrument panel that are components for motor vehicles in the area of the airbag cover where in the area of deployment, a support is provided with a form stabilizing layer.
Figure 9:
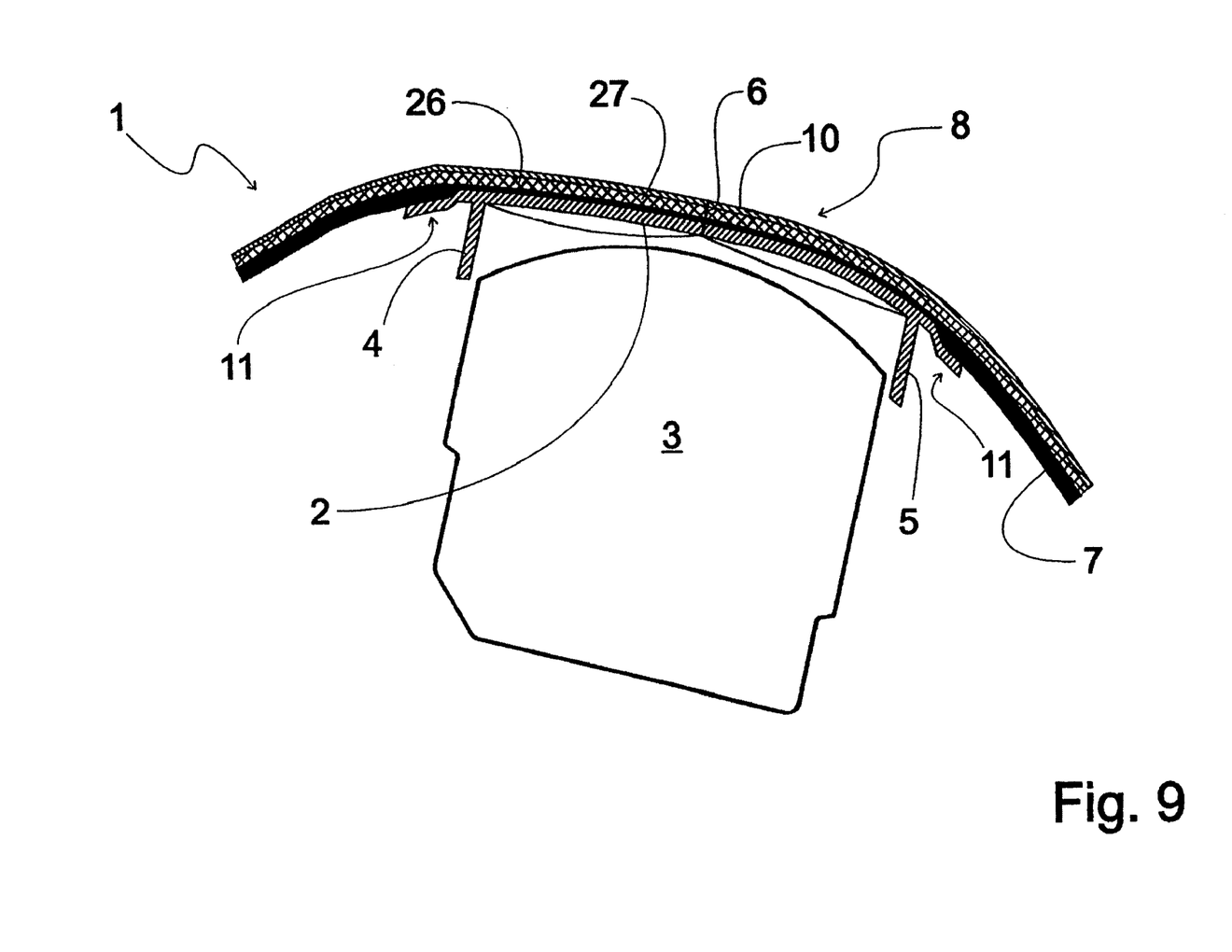
Figure 10:
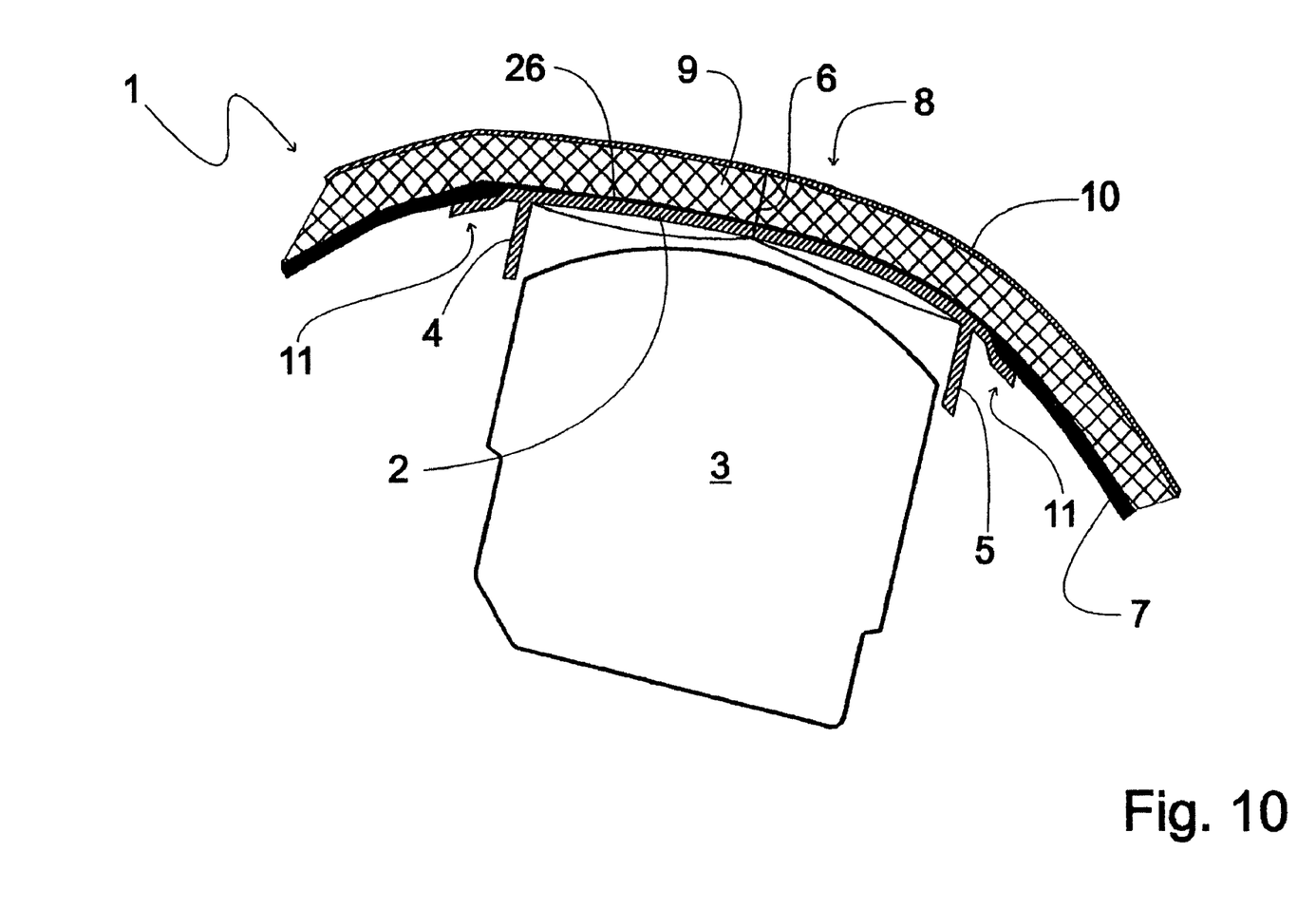

FIG. 8 to 10 shows sections of further embodiments of an instrument panel 1 as a component for motor vehicles in the area of the airbag cover 2, wherein the same corresponding elements are generally indicated by same reference numerals as in the preceding examples of embodiments and are not further explained.

FIG. 8 shows an embodiment which is manufactured in especially cost-efficient manner and where the instrument panel is essentially formed by only one support 7. In the area of deployment 8, the support 7 exhibits a very thin form stabilizing layer relative to the thickness of the remaining material. The thickness of the material of the form stabilizing layer 26 is arranged so that an unimpaired emergence of the air bag and a flexible widening of the airbag cover 2 formed from an elastic material along the weakened zone is ensured. The airbag cover 2 adjoins with its entire surface facing away from the passenger side against the form stabilizing layer 26 so that pieces bursting off the hard material and through the form stabilization layer 26 is prevented.

FIG. 9 shows a further embodiment which elaborates on the embodiment according to FIG. 8. In the embodiment according to FIG. 9, a relatively thin soft foam layer 27 is placed on the support 7 and connected with a film 10. This improves the optical and especially also the haptical impression of the instrument panel 1 as compared to the embodiment according to FIG. 8. The soft foam layer 27 and the film 10 tear apart due to the applied force along the weakened zone 6 under emergence of the unfolding air bag.

FIG. 10 likewise shows a further embodiment which elaborates on the embodiment according to FIG. 8, where corresponding to the embodiment as explained in FIG. 3 and FIG. 4, a foam layer 9 and a film 10 are applied to the support. Due to the use of a relatively stiff form stabilization layer 26, it is ensured that even with a relatively soft foam layer 9 no deformations of the instrument panel are forming in the area of deployment 8, such as cave-in of the top surface.

What is claimed is:

1. An airbag cover assembly comprising:
an air bag cover having more than one layer,
a deployment channel for directing an inflating airbag upon deployment, said deployment channel associated with a suitable support in a vehicle and made of hard plastic material, wherein the deployment channel is provided with side walls terminating in an upper end defining a border of the deployment channel; said airbag cover layers provided with a weakened zone located on a side of the air bag cover pointing away from the vehicle interior, said airbag cover disposed across the deployment channel, wherein the weakened zone is formed as a predetermined line extending in horizontal direction to laterally exceed the border of the deployment channel such that by force of the air bag upon deployment an opening is formed in the air bag cover at the predetermined line and the opening is laterally widened beyond the border of the deployment channel.

2. The airbag cover according to claim 1, wherein the weakened zone extends beyond each side wall by a length which is approximately one half of a distance between each of the side walls of the deployment channel.

3. The airbag cover according to claim 2, wherein the part of the weakened zone which extends beyond each side wall is formed as a material recess at the side of the dashboard facing away from the vehicle interior.

4. The airbag cover according to claim 3, wherein each side wall represents the lateral border of a deployment area.

5. The airbag cover according to claim 4, wherein an overlap area is provided along the area of deployment.

6. The airbag cover according to claim 5, wherein the overlapping area is connected with the support.

7. The airbag cover according to claim 5, wherein the support and the airbag cover terminate in a flush manner at a viewing side.

8. The airbag cover according to claim 7, wherein the walls of the deployment channel at the side facing away from the vehicle interior and the airbag cover are formed in a single piece.

9. The airbag cover according to claim 7, wherein the walls bordering the airbag cover are provided with a decoupling recess.

10. The airbag cover according to claim 1, wherein the elastic material is a polypropylene-ethylene-propylene-dein rubber (PP-EPDM).

11. The airbag cover according to claim 1, wherein the elastic material is the triblock-copolymer styrene-ethylene-butylene-styrene (SEBS).

12. The airbag cover according to claim 1, wherein the support of the dashboard is configured with a form stabilizing layer.

13. The airbag cover according to claim 1, wherein the airbag cover and the support are covered with a foam layer at the side facing the vehicle interior.

14. The airbag cover according to claim 13, wherein the foam layer is covered with a thin film.

* * * * *

UNITED STATES PATENT AND TRADEMARK OFFICE
CERTIFICATE OF CORRECTION

PATENT NO. : 7,055,850 B2  Page 1 of 1
APPLICATION NO. : 10/490121
DATED : June 6, 2006
INVENTOR(S) : Bernd Freystedt

It is certified that error appears in the above-identified patent and that said Letters Patent is hereby corrected as shown below:

TITLE PAGE (73) ASSIGNEE:   Change: "Peguform GmbH & Co KG" to --Peguform GmbH--

Change: "Botzinger" to --Botzingen--

Signed and Sealed this

Thirtieth Day of June, 2009

JOHN DOLL
*Acting Director of the United States Patent and Trademark Office*